(12) United States Patent
Xie et al.

(10) Patent No.: US 12,399,922 B2
(45) Date of Patent: Aug. 26, 2025

(54) APPARATUS, METHOD AND STORAGE MEDIUM FOR DATA QUERY

(71) Applicant: ZILLIZ INC., Redwood City, CA (US)

(72) Inventors: Chao Xie, Redwood City, CA (US); Bang Fu, Shanghai (CN); Xiaofan Luan, Shanghai (CN); Xiangyu Wang, Shanghai (CN)

( * ) Notice: Subject to any disclaimer, the term of this patent is extended or adjusted under 35 U.S.C. 154(b) by 0 days.

(21) Appl. No.: 18/454,356

(22) Filed: Aug. 23, 2023

(65) Prior Publication Data

US 2024/0330343 A1 Oct. 3, 2024

Related U.S. Application Data

(60) Provisional application No. 63/492,924, filed on Mar. 29, 2023.

(51) Int. Cl.
*G06F 16/00* (2019.01)
*G06F 16/334* (2025.01)
(52) U.S. Cl.
CPC ...... *G06F 16/3347* (2019.01); *G06F 16/3344* (2019.01)
(58) Field of Classification Search
CPC .......... G06F 16/3347; G06F 16/3344
See application file for complete search history.

(56) References Cited

U.S. PATENT DOCUMENTS

| 2016/0147888 | A1* | 5/2016 | Nguyen | G06F 16/2471 |
| | | | | 707/707 |
| 2017/0308535 | A1* | 10/2017 | Agarwal | G06F 16/24578 |
| 2021/0165833 | A1* | 6/2021 | Kim | G06N 3/045 |
| 2021/0173874 | A1* | 6/2021 | Giddings | G06N 20/00 |
| 2022/0179858 | A1* | 6/2022 | Chen | G06F 40/30 |

FOREIGN PATENT DOCUMENTS

| CN | 110059172 A | * | 7/2019 | ......... G06F 16/3329 |
| CN | 114238404 A | * | 3/2022 | |
| CN | 115048447 A | * | 9/2022 | |

* cited by examiner

*Primary Examiner* — Dinku W Gebresenbet
(74) *Attorney, Agent, or Firm* — Kim IP Law Group LLC (57) ABSTRACT

The method is applied to a question-answering system including large language model. The question-answering system can store history query information to vector database, and store history query results corresponding to each history query information to scalar database. When receiving the current query request, the question-answering system may first match the current query request with the history query information. If the history query information contains target history query information matching the current query request, the query result of the current query request can be obtained based on the target history query result corresponding to the target history query information. Hence, the question-answering system does not need to obtain the query result by LLM inferring, which is beneficial to reducing the delay of obtaining the query result by the question-answering system and reducing the operation cost of the question-answering system.

17 Claims, 4 Drawing Sheets

APPARATUS, METHOD AND STORAGE MEDIUM FOR DATA QUERY

RELATED APPLICATIONS

The present application claims the benefit of U.S. Provisional Patent Application No. 63/492,924 filed on Mar. 29, 2023, entitled "Caching Method, Apparatus, And Storage Medium", the entire disclosure of which is hereby incorporated herein by reference.

TECHNICAL FIELD

The disclosure relates in general to the field of data processing, and more particularly, to an apparatus, method, and storage medium for data query.

BACKGROUND

With the development of artificial intelligence technology, deep learning models, in particular LLM (large language model), are increasingly used in QAS (question-answering system). LLM is obtained by learning the structure, rules and semantics of one or more languages in a large amount of text data, and an answer having a natural language style (hereinafter referred to as a query result) can be inferred based on an input question or dialogue (hereinafter referred to as a query request). However, if each query request is inputted to the LLM for inferring during the query based on the QAS, the query result fed back by the QAS to the user will be delayed, which affecting user experience will be affected.

SUMMARY

The following examples pertain to embodiments described throughout this disclosure.

One or more embodiments can include an apparatus. The apparatus comprising: a memory for storing instructions; and one or more processors for executing the instructions to perform following process: receiving a query request; determining target history query information matching the query request in a plurality of history query information, wherein the plurality of history query information is stored in vector database, and each of the history query information is obtained by performing feature extraction on one history query request and context information corresponding to the one history query request; obtaining target history query result corresponding . . . to the target history query information from scalar database according to the target history query information; determining query result of the query request based on the target history query result.

One or more embodiments can include an apparatus, wherein determining target history query information matching the query request in a plurality of history query information, comprising: determining query vector corresponding to the query request; comparing the query vector with the plurality of history query information, and determining history query information in the plurality of history query information whose similarity to the query vector meets a preset condition as the target history query information.

One or more embodiments can include an apparatus, wherein the preset condition comprises at least one of the following conditions: the similarity is greater than the first similarity; the similarity is one of the top K similarities in the similarities between the plurality of history query information and the query vector, wherein K≥1.

One or more embodiments can include an apparatus, wherein each of the history query information is obtained by performing feature extraction on one history query request and context information corresponding to the one history query request, comprising: preprocessing a single history query request and the context information corresponding to the one history query request; extracting features of the preprocessed data to obtain the history query information corresponding to the single history query request and the context information corresponding to the single history query request.

One or more embodiments can include an apparatus, wherein determining query vector corresponding to the query request, comprising: performing feature extraction on the query request to obtain the query vector corresponding to the query request; or performing feature extraction on the query request and the context information corresponding to the query request to obtain the query vector corresponding to the query request.

One or more embodiments can include an apparatus, wherein determining query result of the query request based on the target history query result, comprising: if one target history query result exists, determining the existed target history query result as the query result of the query request, or fine-tuning the existed target history query result and determining the fine-tuned result as the query result of the query request; if a plurality of target history query results exist, randomly selecting one of the plurality of target history query results as the query result of the query request, or determining the first target history query result in the plurality of target history query results as the query result of the query request, or determining the plurality of target history query results as the query result of the query request, wherein the similarity between the history query information corresponding to the first target history query result and the query vector is maximum.

One or more embodiments can include an apparatus, wherein the process comprising: determining that there is no history query information matching the query request among the plurality of history query information; inputting the query request into large language model; determining the inference result sent by the large language model as the query result of the query request.

One or more embodiments can include an apparatus, wherein the process comprising: performing feature extraction on the query request and context information corresponding to the query request to obtain first history query information; adding the first history query information to the vector database, and adding the inference result as the history query result corresponding to the first history query information to the scalar database.

One or more embodiments can include a method comprising: receiving a query request; determining target history query information matching the query request in a plurality of history query information, wherein the plurality of history query information is stored in vector database, and each of the history query information is obtained by performing feature extraction on one history query request and context information corresponding to the one history query request; obtaining target history query result corresponding to the target history query information from scalar database according to the target history query information; determining query result of the query request based on the target history query result.

One or more embodiments can include a method, wherein determining target history query information matching the query request in a plurality of history query information, comprising: determining query vector corresponding to the query request; comparing the query vector with the plurality of history query information, and determining history query information in the plurality of history query information whose similarity to the query vector meets a preset condition as the target history query information.

One or more embodiments can include a method, wherein the preset condition comprises at least one of the following conditions: the similarity is greater than the first similarity; the similarity is one of the top K similarities in the similarities between the plurality of history query information and the query vector, wherein K≥1.

One or more embodiments can include a method, wherein each of the history query information is obtained by performing feature extraction on one history query request and context information corresponding to the one history query request, comprising: preprocessing a single history query request and the context information corresponding to the single history query request; extracting features of the preprocessed data to obtain the history query information corresponding to the single history query request and the context information corresponding to the one history query request.

One or more embodiments can include a method, wherein determining query result of the query request based on the target history query result, comprising: if one target history query result exists, determining the existed target history query result as the query result of the query request, or fine-tuning the existed target history query result and determining the fine-tuned result as the query result of the query request; if a plurality of target history query results exist, randomly selecting one of the plurality of target history query results as the query result of the query request, or determining the first target history query result in the plurality of target history query results as the query result of the query request, or determining the plurality of target history query results as the query result of the query request, wherein the similarity between the history query information corresponding to the first target history query result and the query vector is maximum.

One or more embodiments can include a method, wherein the method comprising: determining that there is no history query information matching the query request among the plurality of history query information; inputting the query request into large language model; determining the inference result sent by the large language model as the query result of the query request; performing feature extraction on the query request and context information corresponding to the query request to obtain first history query information; adding the first history query information to the vector database, and adding the inference result as the history query result corresponding to the first history query information to the scalar database.

One or more embodiments can include a computer-readable storage medium having stored thereon instructions that, when executed on an electronic device, cause the electronic device to perform following process: receiving a query request; determining target history query information matching the query request in a plurality of history query information, wherein the plurality of history query information is stored in vector database, and each of the history query information is obtained by performing feature extraction on one history query request and context information corresponding to the one history query request; obtaining target history query result corresponding to the target history query information from scalar database according to the target history query information; determining query result of the query request based on the target history query result.

One or more embodiments can include a computer-readable storage medium, wherein determining target history query information matching the query request in a plurality of history query information, comprising: determining query vector corresponding to the query request; comparing the query vector with the plurality of history query information, and determining history query information in the plurality of history query information whose similarity to the query vector meets a preset condition as the target history query information.

One or more embodiments can include a computer-readable storage medium, wherein the preset condition comprises at least one of the following conditions: the similarity is greater than the first similarity; the similarity is one of the top K similarities in the similarities between the plurality of history query information and the query vector, wherein K≥1.

One or more embodiments can include a computer-readable storage medium, wherein each of the history query information is obtained by performing feature extraction on one history query request and context information corresponding to the one history query request, comprising: preprocessing a single history query request and the context information corresponding to the one history query request; extracting features of the preprocessed data to obtain the history query information corresponding to the single history query request and the context information corresponding to the single history query request.

One or more embodiments can include a computer-readable storage medium, wherein determining query result of the query request based on the target history query result, comprising: if one target history query result exists, determining the existed target history query result as the query result of the query request, or fine-tuning the existed target history query result and determining the fine-tuned result as the query result of the query request; if a plurality of target history query results exist, randomly selecting one of the plurality of target history query results as the query result of the query request, or determining the first target history query result in the plurality of target history query results as the query result of the query request, or determining the plurality of target history query results as the query result of the query request, wherein the similarity between the history query information corresponding to the first target history query result and the query vector is maximum.

One or more embodiments can include a computer-readable storage medium, wherein the process comprising: determining that there is no history query information matching the query request among the plurality of history query information; inputting the query request into large language model; determining the inference result sent by the large language model as the query result of the query request; performing feature extraction on the query request and context information corresponding to the query request to obtain first history query information; adding the first history query information to the vector database, and adding the inference result as the history query result corresponding to the first history query information to the scalar database.

BRIEF DESCRIPTION OF THE FIGURES

The foregoing summary, as well as the following detailed description of the exemplary embodiments, will be better understood when read in conjunction with the appended drawings. For the purpose of illustrating the present disclosure, there are shown in the drawings embodiments, which are presently preferred. However, the present disclosure is not limited to the precise arrangements and instrumentalities shown.

In the drawings.

DETAILED DESCRIPTION

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, and below, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a" as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. In some embodiments, the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

Illustrative embodiments of the present disclosure include, but are not limited to, an apparatus, method, and storage medium for data query.

The technical solutions of the embodiments of the present disclosure are described below with reference to the accompanying drawings.

In some embodiments, the LLM mentioned in the various embodiments of the present disclosure may be any large language model capable of inferring the query result corresponding to the query request based on the query request input to the LLM and the associated data with the query request based on the input associated data. For example, the LLM may include but not limited to ChatGPT (chat generative pre-trained transformer), GPT (generative pre-training)-1, GPT-2, GPT-3, GPT-4, BERT (bidirectional encoder representation from transformers), XLNet, and the like. For case of description, an example in which LLM is ChatGPT is described below.

As described above, if each query request is inputted to the LLM for inferring during the query through the QAS, the query result fed back by the QAS to the user will be delayed and the user experience will be affected. Moreover, since the operation of the LLM depends on a large amount of server resources, the operator providing the LLM function usually charges according to token (i.e., a set of related character sequences, such as a word or a punctuation mark). Inputting each query request into the LLM for inferring also increases the operation cost of the QAS.

In view of the above, an embodiment of the present disclosure provides a data query method, which is applied to a QAS including a large language model. The QAS can store at least one history query information (for example, a feature corresponding to a query request and a context information of the query request) and a history query result corresponding to each history query information. When a query request (hereinafter referred to as a current query request) is received, the QAS may first match the current query request with history query information. If at least one target history query information matching the current query request exists in the history query information, a query result of the current query request is obtained based on the history query result (hereinafter referred to as the target history query result) corresponding to the target history query information.

In some embodiments, if the history query information does not exist in the history query information that matches the current query request, the QAS may input the current query request into the LLM for inferring to obtain the query result of the current query request.

In this way, for the partial query request, the QAS does not need to obtain the query result through the LLM, but obtains the query result of the partial query request based on the target history query result. Since the access speed of the database is much faster than the inferring speed of the LLM, it can reduce the delay in obtaining the query result of the QAS and reduce the operation cost of the QAS.

In some embodiments, the history query request refers to a query request entered into the LLM by the QAS and resulting in a corresponding query result.

In some embodiments, the history query results corresponding to the history query requests may be stored in scalar database.

In some embodiments, the history query information may be obtained by performing feature extraction on the history query request and the context information of the history query request. In some embodiments, the history query information may be stored in vector database by means of a vector.

In some embodiments, the context information of a history query request may include at least one query request preceding the history query request, and the query result (answer) corresponding to the at least one query request.

In some embodiments, the history query information can be obtained by performing feature extraction on the history query request and the context information of the history query request. Hence, the query result of the current query request can be obtained by matching the query request with the history query information by the QAS, and the accuracy of the obtained query result can be improved in some scenarios.

For example, in some cases, the answers to the same query request are different for different contexts and context information.

It is assumed that the first history query request is "What are the local cuisine", the context information of the first history query request includes the query request "How can I go to the center from Shanghai Airport" before the first history query request, and the first history query result corresponding to the first history query request is "AA@meishi.jpg". Wherein: "AA" indicates the text content of the first history query result, and "@meishi.jpg" indicates the access path of the image named meishi. And the first history query information is obtained by performing feature extraction on the context information of the first history query request and the first history query request.

The second history query request is "What are the local cuisine", the context information of the second history query request includes the query request "I am at Beijing Airport, how to go to the city center" before the second history query request, and the second history query result corresponding to the second history query request is "BB". And the second history query information is obtained by performing feature extraction on the context information of the second history query request and the second history query request.

If matching the current query request "What is the cuisine of Shanghai" with the first history query request and the second history query request without the context information of the first history query request and the second history query request, the matching degree between the current query request and the first history query request is similar to the matching degree between the current query request and the second history query request. The QAS may determine the second history query request as a query request that matches the current query request, and further use the second history query result "BB" indicating the food recommended for Beijing, as the query result of the current query request, that is, obtain an incorrect query result "BB".

However, in some embodiments of the present disclosure, the current query request "What is the cuisine of Shanghai" is matched with the first history query information and the second history query information respectively. Since the first history query information includes the information corresponding to "How can I go to the center from Shanghai Airport", which indicating the location of the user, the QAS may determine that the first history query information is the target history query information that matches the current query request. Hence, the QAS may use the first history query result "AA@meishi.jpg" corresponding to the first history query information as the query result of the current query request.

In some embodiments, before extracting the features of the history query request and the context information of the history query request, the context information of the history query request and the context information of the history query request may be preprocessed. Then feature extraction of the preprocessed data is conducted to obtain the history query information. Thus, the accuracy of the history query information can be improved, and the space occupied by the history query information can be reduced. Illustratively, the above preprocessing may include, but is not limited to, extracting summary information, extracting keywords, deleting modification words, partial selection, converting an image/audio/video into text, and the like.

For example, for the context information of the first history request and the first history query request, the first history query information may be obtained by extracting the features of "Shanghai cuisine", in which "Shanghai cuisine" is obtained by preprocessing "What are the local cuisine" and "How can I go to the center from Shanghai Airport".

In some embodiments, the target history query information may be history query requests whose matching degree with the current query request is greater than a matching degree threshold. And the target history query information may be one or more.

In some embodiments, obtaining the query result of the current query request based on the history query result corresponding to the target history query information may include one or more of the following cases:

a) If there is a target history query result, the target history query result is adopted as the query result of the current query request.

b) When a target history query result exists, the target history query result may be post-processed, and the post-processed data is adopted as the query result of the current query request. In some embodiments, the post-processing refers to fine-tuning the target history query result to improve the diversity of the query result obtained by the user.

Figure 1:
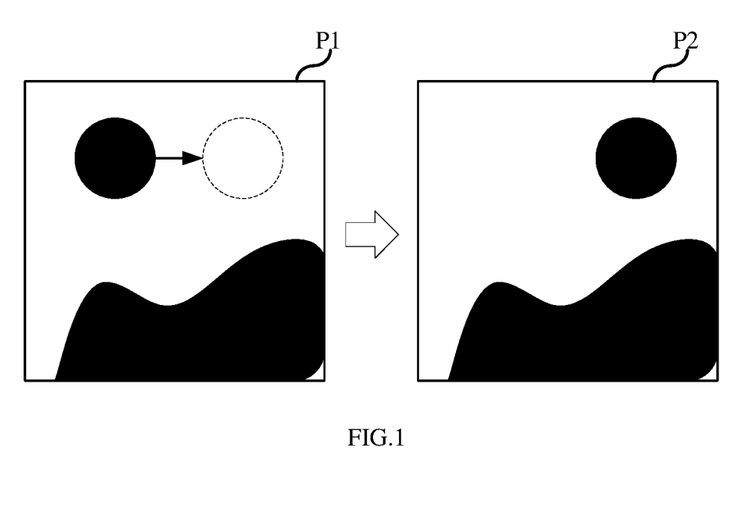
FIG. 1 shows a schematic diagram about fine tuning of a target history query result according to some embodiments of the present disclosure.

For example, assume that the current query request input by the user is "draw a sunrise scene", and the target history query result corresponding to the current query request is the image P1 shown in FIG. 1. The QAS may fine-tune the image P1, for example, move the sun in the image P1 from the left side of the image to the right side of the image to obtain the image P2, and use the image P2 as the query result corresponding to the current query request.

In some embodiments, the QAS may also fine-tune the image parameters of the image corresponding to the target history query result, such as fine-tune the contrast, hue, brightness, saturation and the like. Hence, the query result corresponding to the current query request may be different from the existing result, which can avoid repeatedly outputting the same result.

In some embodiments, the QAS may fine-tune the target history query result in other ways to avoid repeatedly outputting the same result. For example, if the target history query result is audio, the QAS may adjust audio parameters such as volume, tone, and tone color of the audio to obtain the query result corresponding to the current query request, which results in different audio from the existing result.
  c) When a plurality of target history query results exist, the target history query result with the highest matching degree between the corresponding target history query information and the current query request among the plurality of target history query results is adopted as the query result of the current query request.
  d) If a plurality of target history query results exist, target history query result randomly selected from the plurality of target history query results may be adopted to the query result of the current query request. In this way, the diversity of query results obtained by the user can be improved.
  e) When a plurality of target history query results exist, the plurality of target history query results are adopted as query results of the current query request.
  f) When a plurality of target history query results exist, the plurality of target history query results are merged and screened to obtain the query result of the current query request. For example, the target history query request corresponding to the plurality of history query request results and the plurality of history query results may be input to a model (such as a large language model) to obtain a query result of the current query request. Thus, the accuracy of the obtained query result of the current query request can be improved.

In some embodiments, the matching of the current query request with the history query information may be a matching of the current query request with the history query information.

In some embodiments, the matching of the current query request with the history query information may be a matching of the context information of the current query request and the current query request with the history query information, which can improve the accuracy of the obtained target history query information.

The technical solution of the present disclosure is described below in connection with the structure of a specific QAS.

Figure 2:
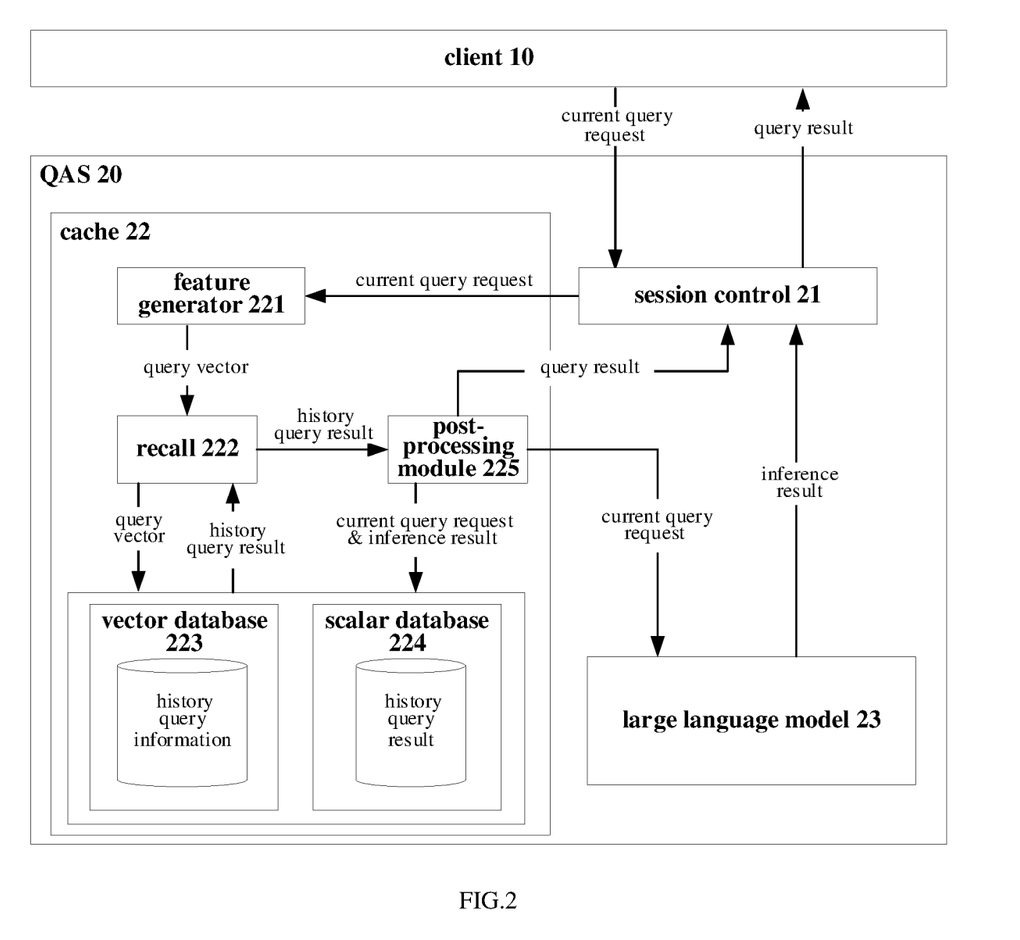
FIG. 2 shows a schematic structural diagram of a QAS 20 according to some embodiments of the present disclosure.

FIG. 2 shows a schematic structural diagram of a QAS 20 according to some embodiments of the present disclosure.

As shown in FIG. 2, the QAS 20 includes a session control 21, a cache 22, and a large language model 23. Wherein, the cache 22 includes a feature generator 221, a recall 222, a vector database 223, a scalar database 224, and a post-processing module 225.

The session control 21 is configured to receive the current query request sent by the user from the client 10 and forward the current query request to the feature generator 221. The session control 21 is also configured to receive the query result of the current query request from the post-processing module 225, receive the inference result (as the query result of the current query request) from the large language model 23 and transmit the query result of the current query request to the client 10.

In some embodiments, the current query request may include questions entered by the user.

In some embodiments, the session control 21 is also configured to embed the context information of the current query request (e.g., one or more questions prior to the questions entered by the user, and the query results of the partial questions), the time stamp of the session into the current query request and send it to the feature generator 221.

The feature generator 221 is configured to perform feature extraction on the current query request to obtain the vector representation corresponding to the current query request (hereinafter referred to as a query vector), and transmit the query vector to the recall 222.

In some embodiments, the feature generator 221 may also be configured to preprocess the current query request, such as extracting keywords, extracting digests, and the like, and then extract features of the preprocessed data to obtain the query vectors.

In some embodiments, feature generator 221 may generate query vectors corresponding to current query requests through cloud services (e.g., OpenAI®, Hugging Face®, Cohere®, etc.).

In some embodiments, the feature generator 221 may also generate query vectors corresponding to current query requests through models in QAS 20.

In some embodiments, the feature generator 221 may be configured to convert images, audio files, and other types of data in the current query requests into query vectors through PyTorch (an open source Python machine learning library) feature generator 221.

The recall 222 is configured to match the query vector with the history query information stored in the vector database 223 to obtain the target history query information, the history query result corresponding to the target history query information from the scalar database 224 based on the target history query information. The recall 222 is also configured to and send the target history query result corresponding to the target history query information to the post-processing module 225.

In some embodiments, the target history query information may satisfy at least one of the following conditions:
  the matching degree (e.g., similarity) between the target history query information and the query vector is greater than the matching degree threshold;
  the target history query information is one of history query information whose matching degree (e.g., similarity) with the query vector is top K of all the history query information in the vector database 223, where K≥1.

In some embodiments, the matching degree between the history query information and the query vector may be represented by the degree of similarity between the vectors, wherein the higher the degree of similarity, the higher the degree of match. Illustratively, the similarity of the history query information to the query vector may be represented by the distance between the history query information and the query vector (e.g., cosine distance, Jacquard distance, valley distance, Hamming distance, Manhattan distance, Chebyshev distance, etc.).

In some embodiments, if the recall 222 does not query the target history query information matching the query vector (i.e., the target history query result is not queried), the post-processing module 225 may send a message (or a message that the target history query result is not queried). Wherein, the message indicates the post-processing module 225 to infer the current query request with the large language model 23.

In some embodiments, if the recall 222 does not query the target history query information that matches the query vector, nothing will be sent to the back-processing module 225. Hence, if the target history query result is not received within a predetermined length of time, the post-processing module 225 uses the large language model 23 to infer the current query request.

In some embodiments, recall 222 may include a similarity estimator for determining the similarity (i.e., the degree of matching) of the query vectors and each history query information. Illustratively, the similarity estimator may determine the similarity (i.e., the degree of matching) between the query vector and each history query information by one or more of exact match, embedding distance, ONNX (open neural network exchange), and problem correlation model evaluation (e.g., albert model, rerank model, etc.).

The post-processing module 225 is configured to obtain the query result corresponding to the current query request based on the target history query result according to one or more following methods Corresponding to the existence of the target history query result, the post-processing module 225 may obtain the query result corresponding to the current query request based on the history query result, and transmit the query result to the session control 21.

In some embodiments, post-processing module 225 may obtain the query result corresponding to the current query request based on at least one of the following ways:
  a) If there is a target history query result, the target history query result is adopted as the query result of the current query request.
  b) When a target history query result exists, the target history query result may be post-processed, and the post-processed data is adopted as the query result of the current query request.
  c) When a plurality of target history query results exist, the target history query result with the highest matching degree between the corresponding target history query information and the current query request among the plurality of target history query results is adopted as the query result of the current query request.
  d) If a plurality of target history query results exist, the target history query result randomly selected from the plurality of target history query results may be adopted to the query result of the current query request.
  e) When a plurality of target history query results exist, the plurality of target history query results are adopted as query results of the current query request.
  f) When a plurality of target history query results exist, the plurality of target history query results are merged and screened to obtain the query result of the current query request.

The post-processing module 225 may input the current query request into the large language model 23 in response to the absence of the target history query result. The current query request is inferred by the large language model 23 to obtain an inference result, and the large language model 23 may send the inference result to the session control 21.

In some embodiments, after obtaining the inference result sent by the large language model 23, the post-processing module 225 may also perform feature extraction on the current query request to obtain the history query information, and store the history query information to the vector database 223. Wherein, the post-processing module 225 may perform feature extraction on the question input by the user in the current query request, or perform feature extraction on the question input by the user in the current query request and the context information of the question.

In some embodiments, the post-processing module 225 may also store the inference result as history query results corresponding to the history query information in the scalar database 224. In this way, when the user inputs the current query request next time, the post-processing module 225 can directly obtain the query result corresponding to the current query request from the scalar database 224 without using the large language model 23 for inferring. In this way, the response speed is improved and the cost of the QAS 20 is reduced.

The vector database 223 is configured to store history query information.

In some embodiments, since the query speed of the vector database is much higher than that of the scalar database, it could increase the acquisition speed of the target history query information by storing the history query information through the vector database, thereby increasing the speed of obtaining the query result corresponding to the current query request.

In some embodiments, each history query information may include a history query information identification that uniquely identifies a piece of history query information.

The scalar database 224 is configured to store history query results.

In some embodiments, each history query result stored in scalar database 224 includes a history query information identification of history query information corresponding to the history query result. Thus, the post-processing module 225 may obtain a corresponding history query result based on the history query information identification of the history query information.

In some embodiments, the scalar database 224 also stores the history query request corresponding to each history query result and context information for the history query request. Thus, the post-processing module 225 may input the context information of the at least one history query request corresponding to the at least one history query result into the large language model 23 to obtain the current query result.

In some embodiments, if a history query result includes files that are large in footprint, such as images, audio, video, etc., the scalar database 224 may store only the access path of the third-party server without storing the portion of the file itself. When the post-processing module 225 queries the history query result, the partial file may be obtained from the third-party server based on the access path. Thus, the scalar database 224 can be saved in space.

The large language model 23 is configured to infer the current query request according to the current query request sent by the post-processing module 225 to obtain the inference result corresponding to the current query request.

In some embodiments, the large-language model 23 may be any large-language model, such as the aforementioned ChatGPT, GPT-1, GPT-2, GPT-3, GPT-3.5, GPT-4, BERT, XLNet, etc., which is not limited herein.

In the QAS 20, the session control 21 may send the current query request to the feature generator 221 after receiving the current query request.

Then, the feature generator 221 performs feature extraction on the current query request to obtain a query vector corresponding to the current query request, and sends the query vector to the recall 222. The recall 222 may acquire the target history query information corresponding to the query vector from the vector database 223 based on the query vector, and acquire the target history query result corresponding to the target history query information from the scalar database 224 based on the target history query information. Then, the recall 222 sends the target history query result to the post-processing module 225.

Next, the post-processing module 225 obtains the query result corresponding to the current query request based on the target history query result when the target history query result exists, and sends the query result to the session control 21, or inputs the current query request to the large language model 23 when the target history query result does not exist to obtain the inference result (as the query result of the current query request), and sends the inference result to the session control 21 by the large language model 23.

Finally, the session control 21 sends the query result corresponding to the current query request to the client 10.

In the process above, in the case where the target history query information matching the current query request exists in the vector database 223 (that is, in the case where the target history query result matching the current query request exists in the scalar database 224), the QAS 20 does not need to infer the current query request by the large language model 23. Since the speed of accessing the vector database 223 and the scalar database 224 is much higher than the speed of inferring with the large language model 23, it can increase the speed of the QAS outputs the query result and reduce the operating cost of the QAS 20.

In some embodiments, the various modules of the QAS 20 may be deployed in the same electronic device, such as a server, or in different servers, and the functions of the various modules in the QAS 20 may be implemented by the processors of the respective servers.

In some embodiments, the configuration of the QAS 20 shown in FIG. 2 is merely an example, and in other embodiments, the QAS 20 may also include more or fewer modules, which are not limited herein.

The technical solution of the present disclosure will be described below in connection with the structure of the QAS 20 shown in FIG. 2.

Figure 3:
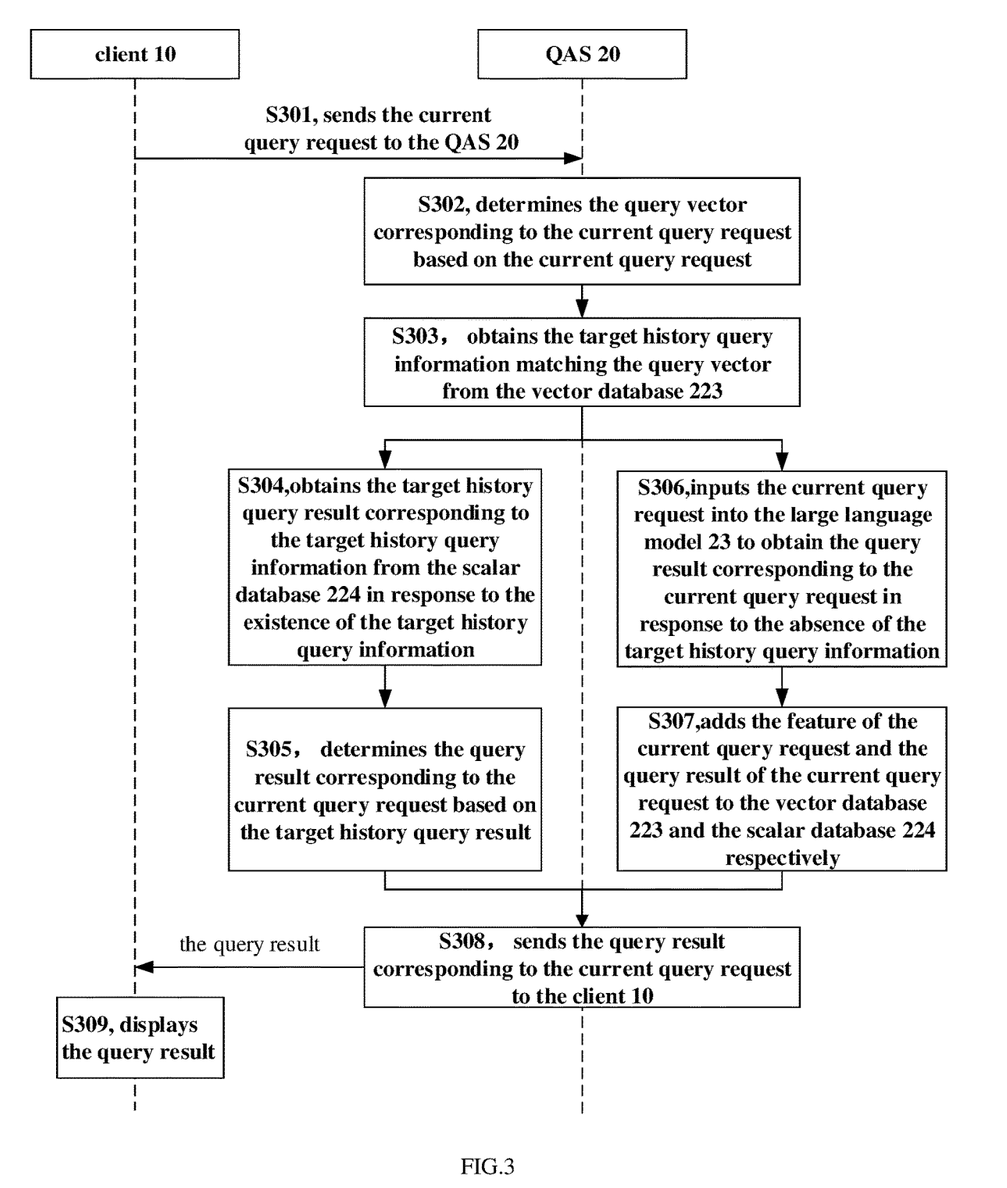
FIG. 3 shows a schematic diagram of an interaction flow of a data query method according to some embodiments of the present disclosure.

Specifically, FIG. 3 illustrates an interactive flow diagram of a data query method according to some embodiments of the present disclosure. As shown in FIG. 3, the interaction flow includes the following steps.

S301, the client 10 sends the current query request to the QAS 20.

In some embodiments, the client 10 may operate in the user's terminal device, and the client 10 may send the query request to the server in which the session control 21 is located. Wherein, the query request may include a question entered by the user.

Illustratively, in some embodiments, a user may enter a current query request through the user interface of the client 10, and the client 10 may send the current query request to the QAS 20 in response to the user's input. For example, referring to FIG. 4, the client 10 may send a current query request to the QAS 20 after the user A enters "What is the cuisine of Shanghai". Wherein, the current query request include the question "What is the cuisine of Shanghai" entered by user A.

In some embodiments, the client 10 may send the query requests to the QAS 20 in other forms or other ways, which are not limited herein.

S302. The QAS 20 determines the query vector corresponding to the current query request based on the current query request.

After receiving the current query request, the QAS 20 determines the query vector corresponding to the current query request in response to the current query request.

Illustratively, the QAS 20 may perform feature extraction on the current query request using the feature generator 221 to obtain the query vector corresponding to the current query request.

Illustratively, the QAS 20 may perform feature extraction on the current query request and the context information of the current query request by using the feature generator 221 to obtain the query vector corresponding to the current query request.

Figure 4:
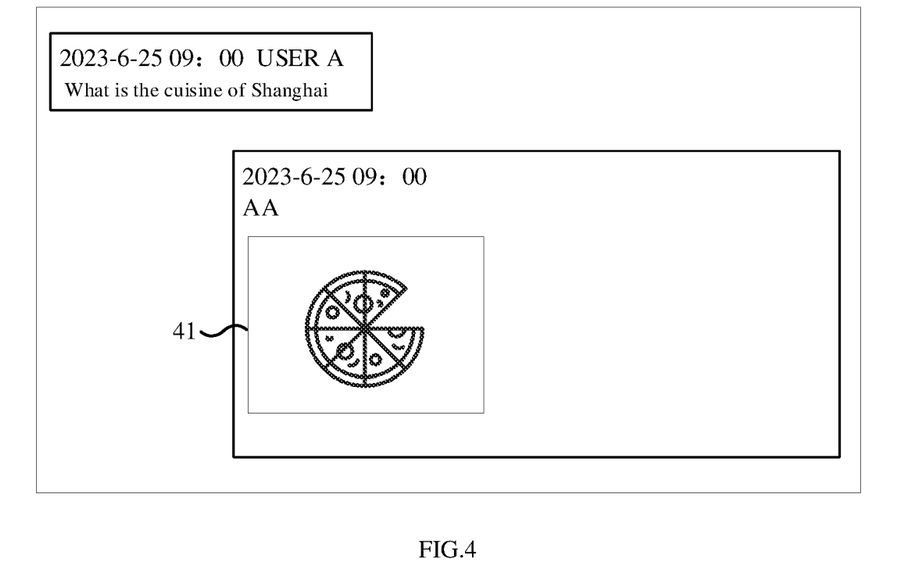
FIG. 4 shows an interface diagram of a data query process according to some embodiments of the present disclosure.

For example, for the case shown in FIG. 4, the QAS 20 may use the feature generator 221 to perform feature extraction on the "What is the cuisine of Shanghai" to obtain the query vector.

In some embodiments, the QAS 20 may preprocess the current query request (e.g., digest extraction, keyword extraction, etc.) and then perform feature extraction on the preprocessed data to obtain the query vector. For example, in the case shown in FIG. 4, the QAS 20 may first preprocess "What is the cuisine of Shanghai" into "Shanghai cuisine" and then perform feature extraction on "Shanghai cuisine" to obtain the query vector.

In some embodiments, the QAS 20 may perform feature extraction on the current query request to obtain a query vector corresponding to the current query request through a cloud service (e.g., OpenAI®, Hugging Face®, and Cohere®).

In some embodiments, the QAS 20 may perform feature extraction on the current query request through a model in the QAS 20 to obtain a query vector corresponding to the current query request.

In some embodiments, the QAS 20 may convert an image, an audio file, and other types of data in the current query request into a query vector through the PyTorch feature generator 221.

S303, the QAS 20 obtains the target history query information matching the query vector from the vector database 223.

After determining the query vector, the QAS 20 compares the query vector with the history query information stored in the vector database 223 to determine the target history query information matching the query vector.

In some embodiments, the target history query information may satisfy at least one of the following conditions: the matching degree (e.g., similarity) between the target history query information and the query vector is greater than the matching degree threshold; the target history query information is one of history query information whose matching degree (e.g., similarity) with the query vector is top K of all the history query information in the vector database 223, where K≥1.

Illustratively, the QAS 20 may calculate the similarity between the respective history query information and the query vector through the recall 222, and determine the top K history query information whose similarity with the query vector is top K of all the history query information in the vector database 223.

Illustratively, the QAS 20 may determine the similarity between the respective history query information and the query vector through the recall 222, and determine the K history query information among the history query information whose similarity to the query vector is greater than the similarity threshold and whose similarity to the query vector is top K of all the history query information. In some embodiments, if the number of the history query information whose similarity to the query vector is greater than the similarity threshold is less than K (e.g., M), the M history query information may be determined as target history query information.

In some embodiments, recall 222 may include a similarity estimator for determining the similarity between the query vectors and each history query information.

In some embodiments, the existing of target history query information indicates that there are history query results in scalar database 224 that match the current query request. The process may proceed to step S304 to acquire a target history query result corresponding to the target history query information.

In some embodiments, if target history query information is not queried, it indicates that there are no history query results in scalar database 224 that match the current query request. The process may proceed to S306, in which the current query request is inferred by the large language model 23 to obtain the query result corresponding to the current query request.

For example, it is assumed that the vector database 223 includes the aforementioned first history query information and the second history query information. With respect to the current query request "What is the cuisine of Shanghai" shown in FIG. 4, the query vector corresponding to the current query request may be compared with the first history query information and the second history query information. Then it is determined that the first history query information is the target history query information (for example, the similarity between the query vector and the first history query information is greater than the similarity threshold). And the second history query information is not the target history query information (for example, the similarity between the query vector and the second history query information is less than the similarity threshold).

S304, The QAS 20 obtains the target history query result corresponding to the target history query information from the scalar database 224 in response to the existence of the target history query information.

The QAS 20 obtains the target history query result corresponding to the target history query information from the scalar database 224 when it is determined that the target history query information has been queried from the vector database 223.

Illustratively, the QAS 20 may query the corresponding target history query result from the scalar database 224 through the history query information identification corresponding to the target history query information using the recall 222, and transmit the target history query result to the post-processing module 225.

For example, for the case shown in FIG. 4, the recall 222 may query the first history query result "AA@meishi.jpg" corresponding to the first history query information from the scalar database 224 based on the history query information identification of the first history query information, and send "AA@meishi.jpg" to the post-processing module 225.

In some embodiments, recall 222 may also send the image corresponding to "@meishi.jpg" to the post-processing module 225 together with the text "AA".

S305. The QAS 20 determines the query result corresponding to the current query request based on the target history query result.

After receiving the target history query result, the QAS 20 determines the query result corresponding to the current query request based on the target history query result.

Illustratively, in some embodiments, the QAS 20 may utilize the post-processing module 225 to obtain a query result corresponding to the current query request by at least one of the following ways:

a) If there is a target history query result, the target history query result is adopted as the query result of the current query request. For example, for the case shown in FIG. 4, the post-processing module 225 may use the images corresponding to the text "AA" and the image corresponding to the "@meishi.jpg".

b) When a target history query result exists, the target history query result may be post-processed, and the post-processed data is adopted as the query result of the current query request. In some embodiments, the post-processing refers to fine-tuning the target history query result to improve the diversity of the query result obtained by the user.

c) When a plurality of target history query results exist, the target history query result with the highest matching degree between the corresponding target history query information and the current query request among the plurality of target history query results is adopted as the query result of the current query request. For example, for the case shown in FIG. 4, if the target history query result further includes a third history query result, the similarity between the third history query information corresponding to the third history query result and the query vector is higher than the similarity between the first history query information and the query vector, and the post-processing module 225 may use the third history query result as the query result of the current query request.

d) If a plurality of target history query results exist, the target history query result randomly selected from the plurality of target history query results may be adopted to the query result of the current query request.

e) When a plurality of target history query results exist, the plurality of target history query results are adopted as query results of the current query request. For example, in the case shown in FIG. 4, if the target history query result further includes the fourth history query result, the post-processing module 225 may use the fourth history query result and the first history query result as query results of the current query request. Illustratively, the post-processing module 225 may feedback the two query results to the user for viewing.

f) When a plurality of target history query results exist, the plurality of target history query results are merged and screened to obtain the query result of the current query request. For example, for the case shown in FIG. 4, if the target history query result further includes the fifth history query result "BB". The post-processing module 225 may combine the fifth history query result and the first history query result to obtain the query result "AA@meishi.jpgBB".

In some embodiments, the QAS 20 may derive query results corresponding to the current query request based on history query results in other ways, which is not limited herein.

S306, the QAS 20 inputs the current query request into the large language model 23 to obtain the query result corresponding to the current query request in response to the absence of the target history query information.

In the case where there is no target history query information matching the query vector, the QAS 20 inputs the current query request to the large language model 23, and uses the inference result inferred by the large language model 23 as the query result corresponding to the current query request.

In some embodiments, the QAS 20 may also input the current query request and the context information of the current query request into the large language model 23 together to obtain the query result corresponding to the current query request.

S307, the QAS 20 adds the feature of the current query request and the query result of the current query request to the vector database 223 and the scalar database 224 respectively.

When the query result corresponding to the current query request is obtained by the large language model 23, the QAS 20 performs feature extraction on the current query request and the context information corresponding to the current query request to obtain the history query information. Then the QAS adds the history query information to the vector database 223, and adds the query result corresponding to the current query request as the history query result corresponding to the history query information to the scalar database 224.

In some embodiments, the QAS 20 may preprocess the context information of the current query request and the current query request before performing feature extraction on the context information of the current query request, and then perform feature extraction on the preprocessed data to obtain history query information. Thus, the accuracy of the history query information can be improved, and the space occupied by the history query information can be reduced.

In some embodiments, the above preprocessing may include, but is not limited to, extracting summary information, extracting keywords, deleting modification words, partial selection, converting an image/audio/video into text, and the like.

In some embodiments, if the QAS 20 performs the processes of step S306, step S307, and step S308, the QAS 20 may exchange the order of step S307 and step S308, or may combine step S307 and step S308, or may not perform step S307, which is not limited herein.

S308, the QAS 20 sends the query result corresponding to the current query request to the client 10.

After obtaining the query result corresponding to the current query request based on the target history query result, or after inputting the current query request into the large language model 23 to obtain the query result corresponding to the current query request, the QAS 20 sends the query result corresponding to the current query request to the client 10.

For example, for the case shown in FIG. 4, the QAS 20 may send "AA@meishi.jpg" to the client 10, or may send an image 41 corresponding to "@meishi.jpg" to client 10.

S309, the client 10 displays the query result.

The client 10 displays the query result after receiving the query result corresponding to the current query request.

For example, for the case shown in FIG. 4, if the query result received by the client 10 is "AA@meishi.jpg", the client 10 may acquire an image 41 corresponding to "@meishi.jpg" based on "@meishi.jpg" and then display the text "AA" and the image 41. If the query result received by the client 10 is "AA" and image 41, the client 10 may directly display the text "AA" and the image 41.

According to the method provided in the present disclosure, when there is target history query request matching the current query request, the query result corresponding to the current query request is obtained based on the target history query result. In this way, the speed at which the QAS 20 obtains the query result corresponding to the current query request can be improved, and the operation cost of the QAS 20 can be reduced.

Figure 5:
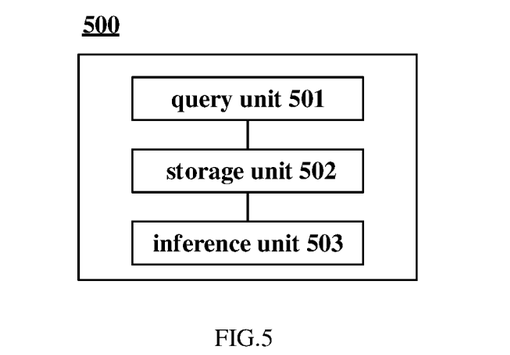
FIG. 5 shows a schematic structural diagram of a data query apparatus 500 according to some embodiments of the present disclosure.

Further, an embodiment of the present disclosure further provides a data query apparatus 500 including query unit 501, storage unit 502, and inference unit 503.

The query unit 501 is configured to receive the current query request, and query the target history query result matching the current query request in the storage unit 502.

Then, when a target history query result matching the current query request exists, the query unit 501 determines the query result corresponding to the current query request based on the target history query result. When the target history query result matching the current query request does not exist, the query unit 501 adopts the inference unit 503 to infer the query result of the current query request.

For example, after receiving the current query request of the user, the query unit 501 may first perform feature extraction on the query request to obtain a query vector corresponding to the current query request. Then, the query unit 501 obtains the target history query vector matching the query vector from the storage unit 502 based on the query vector, and obtains the target history query result corresponding to the target history query vector from the storage unit 502 based on the target history query vector. Hereafter, the query unit 501 determine the query result corresponding to the current query request based on the target history query result.

In some embodiments, the query unit 501 is further configured to add a current query request and the inference result derived by the inference unit 503 based on the current query request to the storage unit 502.

In some embodiments, the implementation of the related functions of the query unit 501 may refer to the foregoing steps S302 to S308, or the related descriptions of the session control 21, the feature generator 221, the recall 222, and the post-processing module 225, and details are not described herein.

The storage unit 502 is configured to store history query information and history query results.

In some embodiments, the storage unit 502 may include vector database for storing history query information and a scalar database for storing history query results.

The inference unit 503 is configured to infer the corresponding query result of the current query request according to the current query request input by the query unit 501 with using the LLM. In some examples, LLM may be any of the foregoing ChatGPT, GPT-1, GPT-2, GPT-3, GPT-3.5, GPT-4, BERT, XLNet.

In some embodiments, the structure of the data query apparatus 500 shown in FIG. 5 is merely an example, and in other embodiments, the data query apparatus 500 may also include more or fewer models, and may also combine or split partial modules, which are not limited herein.

In some embodiments, the various modules of the data query apparatus 500 may be deployed in the same or different electronic devices, and are not limited herein.

Figure 6:
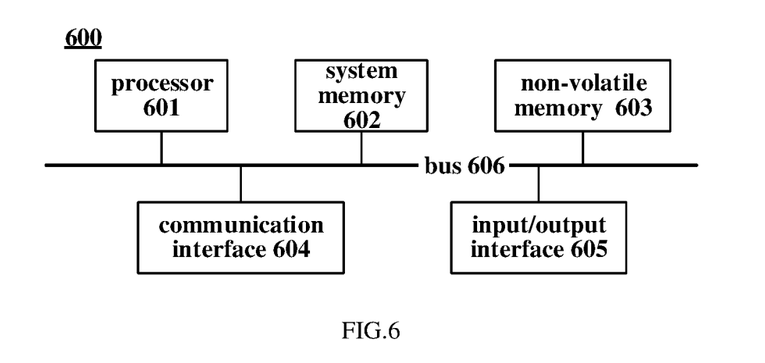
FIG. 6 shows a schematic structural diagram of an electronic device 600 according to some embodiments of the present disclosure.

Further, FIG. 6 shows a schematic structural diagram of an electronic device 600 according to some embodiments of the present disclosure. The electronic device 600 may be an electronic device that runs one or more modules of the data query apparatus 500, or an electronic device that deploys one or more units of the QAS 20.

As shown in FIG. 6, electronic device 600 may include one or more processors 601, system memory 602, non-volatile memory (NVM) 603, communication interface 604, input/output (I/O) interface 605, and bus 606. Wherein:

The processor 601 may include one or more single-core or multi-core processors. In some embodiments, the processor 601 may include any combination of a general purpose processor and a special purpose processor (e.g., a graphics processor, an application processor, a baseband processor, etc.). In some embodiments, the processor 601 may execute instructions corresponding to the data query methods provided in the foregoing embodiments.

For example, the processor 601 may be configured to execute one or more of following instructions:

an instruction for generating a query vector corresponding to a current query request;

an instruction for obtaining a target history query result corresponding to the current query request from the storage unit 503/vector database 223/scalar database 224;

an instruction for obtaining a query result corresponding to the current query request based on the target history query result;

an instruction for obtaining a query result corresponding to the current query request by using the large language model 23/inference unit 503;

an instruction for adding the current query request and the query results inferred by the language model 23/inference unit 503 to the storage unit 503/vector database 223/scalar database 224.

The system memory 602 is volatile memory such as RAM (random-access memory), DDR SDRAM (double data rate synchronous dynamic random access memory), or the like. The system memory 602 is adopted to temporarily store data and/or instructions. For example, in some embodiments, the system memory 602 may be adopted to temporarily store instructions of the data query method provided in the foregoing embodiments, target history query information, target history query result.

The non-volatile memory 603 may include one or more tangible, non-transitory computer-readable media for storing data and/or instructions. In some embodiments, the nonvolatile memory 603 may include any suitable nonvolatile memory, such as flash memory, and/or any suitable non-volatile storage device, such as a hard disk drive (HDD), compact disc (CD), digital versatile disc (DVD), solid-state drive (SSD), and the like. The non-volatile memory 603 may also be a removable storage medium, such as a secure digital (SD) memory card. In some embodiments, the non-volatile memory 603 may be used to store instructions of the data query method provided in the foregoing embodiments, or may be used to store target history query information, target history query result, and the like.

Communication interface 604 may include a transceiver for providing a wired or wireless communication interface for electronic device 600 to communicate with any other suitable device over one or more networks. In some embodiments, the communication interface 604 may be integrated with other components of the electronic device 600, e.g., the communication interface 604 may be integrated in the processor 601. In some embodiments, electronic device 600 may communicate with other devices through communication interface 604.

An input/output (I/O) interface 605 may be used to connect input/output devices, such as displays, keyboards, mice, and the like.

Bus 606 is used to provide a suitable access interface for each module of the electronic device.

In some embodiments, the electronic device 600 may be any electronic device. For example, the device 600 may be a tablet computer, a desktop computer, a server/server cluster, a laptop computer, a handheld computer, a notebook computer, a desktop computer, a super mobile personal computer, a netbook, and the like. the embodiments of the present disclosure are not limited.

In some embodiments, the configuration of the electronic device 600 shown in the embodiments of the present disclosure does not constitute a specific limitation on the electronic device 600. In other embodiments of the present disclosure, electronic device 600 may include more or fewer components than illustrated, or may combine certain components, or may split certain components, or may have different component arrangements. The illustrated components may be implemented in hardware, software, or a combination of software and hardware.

While the present disclosure has been illustrated and described with reference to certain preferred embodiments thereof, it will be understood by those of ordinary skill in the art that various changes may be made in form and detail without departing from the spirit and scope of the present disclosure.

The illustrated components may be implemented in hardware, software, or a combination of software and hardware. The embodiments disclosed herein may be implemented in hardware, software, firmware, or a combination of these embodiments. Embodiments of the present disclosure may be implemented as a computer program or program code executing on a programmable system including at least one processor, a storage system (including volatile and non-volatile memory and/or storage elements), at least one input device, and at least one output device.

Program code may be applied to the input instructions to perform the functions described herein and to generate output information. The output information may be applied to one or more output devices in a known manner. For purposes of the present disclosure, a processing system includes any system having a processor such as, for example, DSP (digital signal processor), microcontroller, ASIC (application specific integrated circuit), or microprocessor. The program code may be implemented in a high-level programming language or an object-oriented programming language to communicate with the processing system. The program code may also be implemented in assembly language or machine language, if desired. Indeed, the mechanisms described herein are not limited in scope to any particular programming language. In either case, the language may be a compilation language or an interpretation language.

In some cases, the disclosed embodiments may be implemented in hardware, firmware, software, or any combination thereof. The disclosed embodiments may also be implemented as instructions carried by or stored on one or more temporary or non-temporary machine-readable (e.g., computer-readable) storage media, which may be read and executed by one or more processors. For example, the instructions may be distributed through a network or through other computer-readable media. Thus, a machine-readable medium may include any mechanism for storing or transmitting information in a form readable by a machine (e.g., a computer), including, but not limited to, a floppy disk, an optical disk, an optical disk, a magneto-optical disk, a ROM (read-only memory), RAM (random access memory), EPROM (erasable programmable read-only memory), EEPROM (electrically erasable programmable read-only memory), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features may be shown in a particular arrangement and/or sequence. However, in some embodiments, such a particular arrangement and/or ordering may not be required. Rather, in some embodiments, these features may be arranged in a manner and/or sequence different from that shown in the illustrative drawings. In addition, the inclusion of structural or methodical features in a particular figure is not meant to imply that such features are required in all embodiments, and that such features may not be included or may be combined with other features in some embodiments.

It should be noted that each unit/module mentioned in each device embodiment of the present disclosure is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the present disclosure. Furthermore, in order to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It is to be noted that in the embodiments and description of the present disclosure, relational terms such as first and second etc. are used solely to distinguish one entity or operation from another entity or operation, and do not necessarily require or imply any such actual relationship or order between such entities or operations. Moreover, the terms "comprises" "comprising" or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one"; does not rule out there are additional identical elements in the process, method, article, or apparatus that includes the element.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: A alone; A and B; A, B and C; A, B, C, and D; and so forth. The bounds of an "and/or" list are defined by the complete set of combinations and permutations for the list.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as disclosed above.

The invention claimed is:

1. An apparatus applied to a question-answering system (QAS), comprising:
   a memory for storing instructions; and
   one or more processors for executing the instructions to perform following process:
      receiving a query request;
      determining at least one target history query information matching the query request in a plurality of history query information based on a similarity estimator in the QAS, wherein the plurality of history query information is stored in vector database, and each of the history query information is obtained by performing feature extraction on one history query request and context information corresponding to the one history query request, and the context information corresponding to the one history query request includes query request which is entered into the QAS before user enters the one history query request;
      obtaining the at least one target history query information from the vector database;
      obtaining at least one target history query result corresponding to the at least one target history query information from scalar database according to the at least one target history query information, wherein each target history query information corresponds to one target history query result;
   determining query result of the query request based on the at least one target history query result, by a post-processing module in the QAS;
      wherein determining query result of the query request based on the at least one target history query result, comprising:

in response to determining that the number of the at least one target history query result is one, fine-tuning the target history query result and determining the fine-tuned result as the query result of the query request,
wherein fine-tuning the target history query result and determining the fine-tuned result as the query result of the query request, comprises: when the target history query result includes an image, fine-tuning image parameters of the image to obtain the query result of the query request, wherein the image parameters include contrast, hue, brightness, saturation; when the target history query result includes an audio, fine-tuning audio parameters of the audio to obtain the query result of the query request, wherein the audio parameters include volume, tone and tone color; and,
in response to determining that the number of the at least one target history query result is multiple, randomly selecting one of multiple target history query results as the query result of the query request, or determining a first target history query result in the multiple target history query results as the query result of the query request, or determining the multiple target history query results as the query result of the query request, or inputting the multiple target history query results into a large language model to obtain the query result of the query request, wherein the similarity between the history query information corresponding to the first target history query result and query vector corresponding to the query request determined by the similarity estimator is maximum.

2. The apparatus of claim 1, wherein:
determining at least one target history query information matching the query request in a plurality of history query information, comprising:
determining query vector corresponding to the query request;
comparing the query vector with the plurality of history query information, and determining at least one history query information in the plurality of history query information whose similarity to the query vector meets a preset condition as the at least one target history query information.

3. The apparatus of claim 2, wherein:
the preset condition comprises at least one of the following conditions:
the similarity is greater than the first similarity;
the similarity is one of the top K similarities in the similarities between the plurality of history query information and the query vector, wherein K≥1.

4. The apparatus of claim 2, wherein:
each of the history query information is obtained by performing feature extraction on one history query request and context information corresponding to the one history query request, comprising:
preprocessing a single history query request and the context information corresponding to the single history query request;
extracting features of the preprocessed data to obtain the history query information corresponding to the single history query request and the context information corresponding to the single history query request.

5. The apparatus of claim 2, wherein:
determining query vector corresponding to the query request, comprising:
performing feature extraction on the query request to obtain the query vector corresponding to the query request; or performing feature extraction on the query request and the context information corresponding to the query request to obtain the query vector corresponding to the query request.

6. The apparatus of claim 1, wherein the process comprising:
determining that there is no history query information matching the query request among the plurality of history query information;
inputting the query request into large language model;
determining the inference result sent by the large language model as the query result of the query request.

7. The apparatus of claim 6, wherein the process comprising:
performing feature extraction on the query request and context information corresponding to the query request to obtain first history query information;
adding the first history query information to the vector database, and adding the inference result as the history query result corresponding to the first history query information to the scalar database.

8. A method applied to a question-answering system (QAS), comprising:
receiving a query request;
determining at least one target history query information matching the query request in a plurality of history query information based on a similarity estimator in the QAS, wherein the plurality of history query information is stored in vector database, and each of the history query information is obtained by performing feature extraction on one history query request and context information corresponding to the one history query request, and the context information corresponding to the one history query request includes query request which is entered into the QAS before user enters the one history query request;
obtaining the at least one target history query information from the vector database;
obtaining at least one target history query result corresponding to the at least one target history query information from scalar database according to the at least one target history query information, wherein each target history query information corresponds to one target history query result;
determining query result of the query request based on the at least one target history query result, by a post-processing module in the QAS;
wherein determining query result of the query request based on the at least one target history query result, comprising:
in response to determining that the number of the at least one target history query result is one, fine-tuning the target history query result and determining the fine-tuned result as the query result of the query request, wherein fine-tuning the target history query result and determining the fine-tuned result as the query result of the query request, comprises: when the target history query result includes an image, fine-tuning image parameters of the image to obtain the query result of the query request,
wherein the image parameters include contrast, hue, brightness, saturation; when the target history query result includes an audio, fine-tuning audio parameters of the audio to obtain the query result of the query request, wherein the audio parameters include volume, tone and tone color; and, in response to determining that the number of the at least one target history query result is multiple, randomly selecting one of multiple target history query results as the query result of the query request, or determining a first target history query result in the multiple target history query results as the query result of the query request, or determining the multiple target history query results as the query result of the query request, or inputting the multiple target history query results into a large language model to obtain the query result of the query request, wherein the similarity between the history query information corresponding to the first target history query result and query vector corresponding to the query request determined by the similarity estimator is maximum.

9. The method of claim 8, wherein:
determining at least one target history query information matching the query request in a plurality of history query information, comprising:
determining query vector corresponding to the query request;
comparing the query vector with the plurality of history query information, and
determining at least one history query information in the plurality of history query information whose similarity to the query vector meets a preset condition as the at least one target history query information.

10. The method of claim 9, wherein the preset condition comprises at least one of the following conditions:
the similarity is greater than the first similarity;
the similarity is one of the top K similarities in the similarities between the plurality of history query information and the query vector, wherein K≥1.

11. The method of claim 9, wherein:
each of the history query information is obtained by performing feature extraction on one history query request and context information corresponding to the one history query request, comprising:
preprocessing a single history query request and the context information corresponding to the single history query request;
extracting features of the preprocessed data to obtain the history query information corresponding to the single history query request and the context information corresponding to the single history query request.

12. The method of claim 9, wherein the method comprising:
determining that there is no history query information matching the query request among the plurality of history query information;
inputting the query request into large language model;
determining the inference result sent by the large language model as the query result of the query request;
performing feature extraction on the query request and context information corresponding to the query request to obtain first history query information;
adding the first history query information to the vector database, and adding the inference result as the history query result corresponding to the first history query information to the scalar database.

13. A non-transitory computer-readable storage medium applied to a question-answering system (QAS) having stored thereon instructions that, when executed on an electronic device, cause the electronic device to perform following process:
receiving a query request;
determining at least one target history query information matching the query request in a plurality of history query information based on a similarity estimator in the QAS, wherein the plurality of history query information is stored in vector database, and each of the history query information is obtained by performing feature extraction on one history query request and context information corresponding to the one history query request and the context information corresponding to the one history query request includes query request which is entered into the QAS before user enters the one history query request;
obtaining the at least one target history query information from the vector database;
obtaining at least one target history query result corresponding to the at least one target history query information from scalar database according to the at least one target history query information, wherein each target history query information corresponds to one target history query result;
determining query result of the query request based on the at least one target history query result, by a post-processing module in the QAS;
wherein determining query result of the query request based on the at least one target history query result, comprising:
in response to determining that the number of the at least one target history query result is one, fine-tuning the target history query result and determining the fine-tuned result as the query result of the query request, wherein fine-tuning the target history query result and determining the fine-tuned result as the query result of the query request, comprises: when the target history query result includes an image, fine-tuning image parameters of the image to obtain the query result of the query request, wherein the image parameters include contrast, hue, brightness, saturation; when the target history query result includes an audio, fine-tuning audio parameters of the audio to obtain the query result of the query request, wherein the audio parameters include volume, tone and tone color; and,
in response to determining that the number of the at least one target history query result is multiple, randomly selecting one of multiple target history query results as the query result of the query request, or determining a first target history query result in the multiple target history query results as the query result of the query request, or determining the multiple target history query results as the query result of the query request, or inputting the multiple target history query results into a large language model to obtain the query result of the query request, wherein the similarity between the history query information corresponding to the first target history query result and query vector corresponding to the query request determined by the similarity estimator is maximum.

14. The non-transitory computer-readable storage medium of claim 13, wherein:
determining at least one target history query information matching the query request in a plurality of history query information, comprising:
determining query vector corresponding to the query request;
comparing the query vector with the plurality of history query information, and determining at least one history query information in the plurality of history query information whose similarity to the query vector meets a preset condition as the at least one target history query information.

15. The non-transitory computer-readable storage medium of claim 14, wherein:
the preset condition comprises at least one of the following conditions:
the similarity is greater than the first similarity;
the similarity is one of the top K similarities in the similarities between the plurality of history query information and the query vector, wherein K≥1.

16. The non-transitory computer-readable storage medium of claim 14, wherein:
each of the history query information is obtained by performing feature extraction on one history query request and context information corresponding to the one history query request, comprising:
preprocessing a single history query request and the context information corresponding to the one history query request;
extracting features of the preprocessed data to obtain the history query information corresponding to the single history query request and the context information corresponding to the single history query request.

17. The non-transitory computer-readable storage medium of claim 14, wherein the process comprising:
determining that there is no history query information matching the query request among the plurality of history query information;
inputting the query request into large language model;
determining the inference result sent by the large language model as the query result of the query request;
performing feature extraction on the query request and context information corresponding to the query request to obtain first history query information;
adding the first history query information to the vector database, and adding the inference result as the history query result corresponding to the first history query information to the scalar database.

* * * * *